Figure 1:
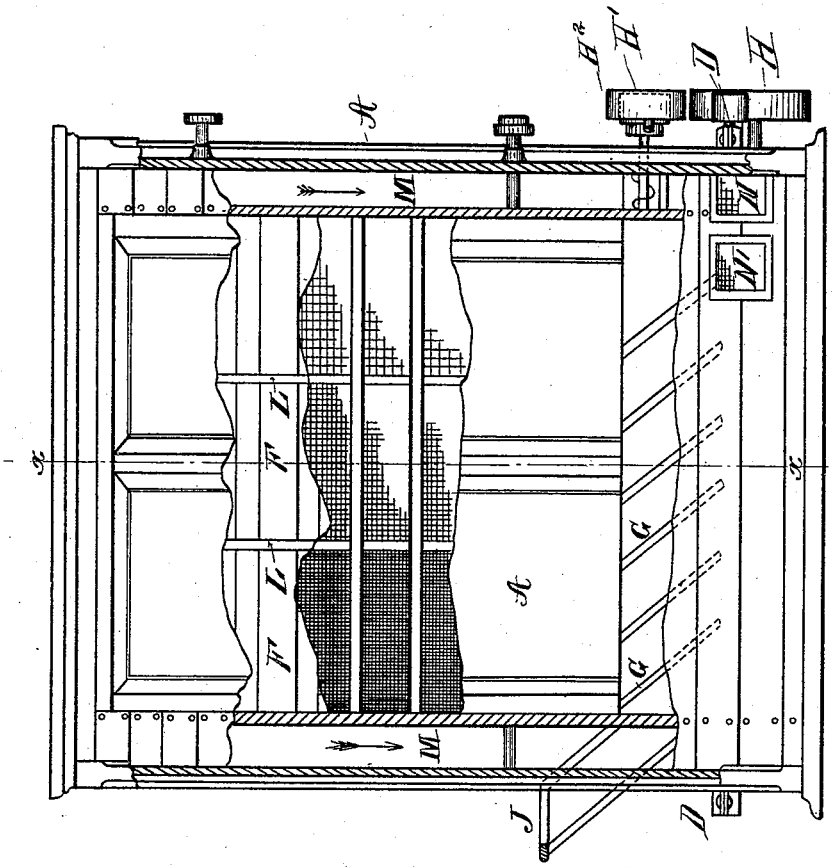

(No Model.)  5 Sheets—Sheet 1.

N. W. HOLT.
COMBINED SCALPER, PURIFIER, AND GRADER.

No. 484,202. Patented Oct. 11, 1892.

WITNESSES
F. Clough
Dell J. Browne

INVENTOR
Noah W. Holt
by Parker & Burton
Attorneys.

(No Model.) 5 Sheets—Sheet 2.

N. W. HOLT.
COMBINED SCALPER, PURIFIER, AND GRADER.

No. 484,202. Patented Oct. 11, 1892.

WITNESSES

INVENTOR (No Model.) 5 Sheets—Sheet 3.
N. W. HOLT.
COMBINED SCALPER, PURIFIER, AND GRADER.
No. 484,202. Patented Oct. 11, 1892.
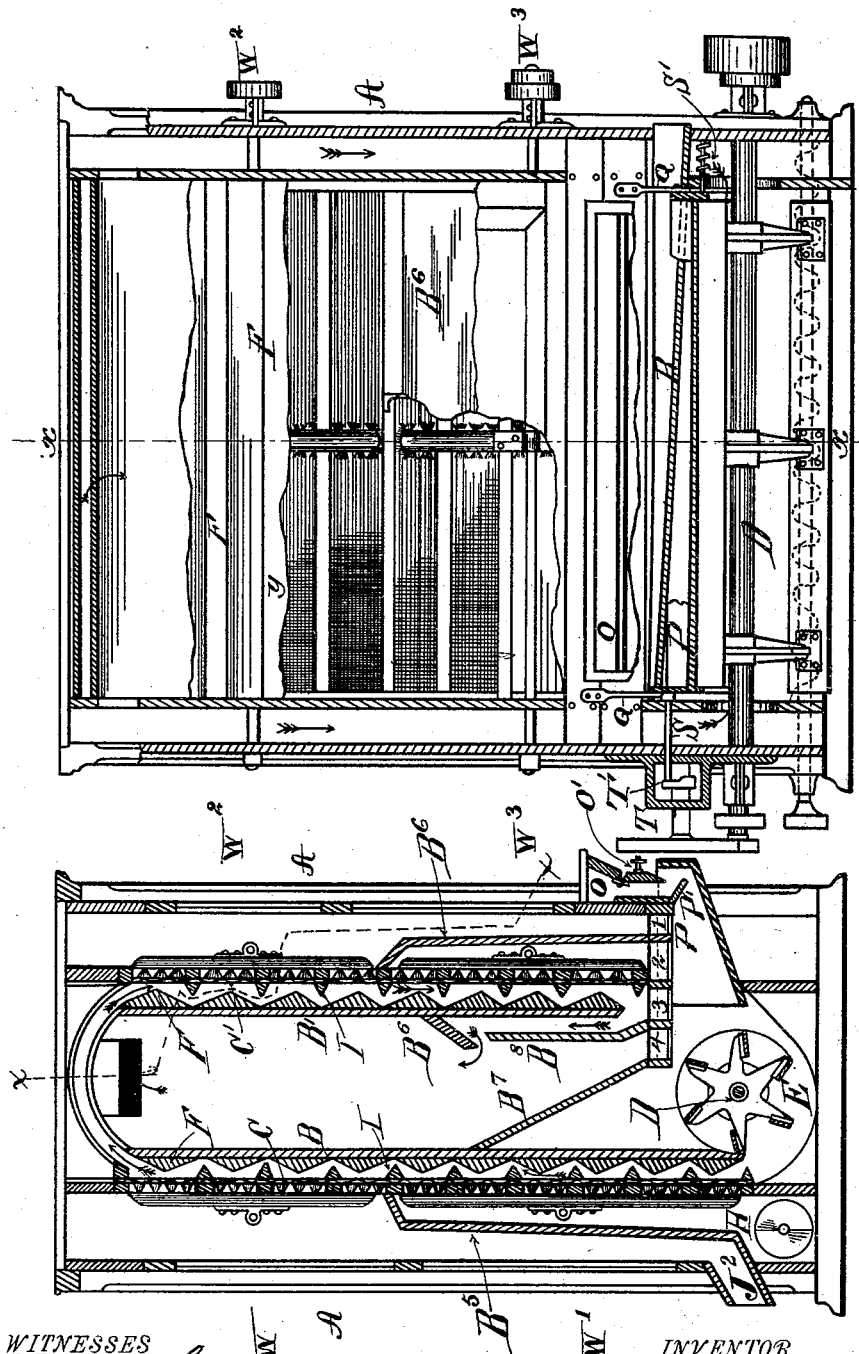
WITNESSES
F. Clough
Dell J. Browne
INVENTOR
Noah W. Holt
by Parker & Burton
Attorneys.

(No Model.) 5 Sheets—Sheet 4.
N. W. HOLT.
COMBINED SCALPER, PURIFIER, AND GRADER.
No. 484,202. Patented Oct. 11, 1892.
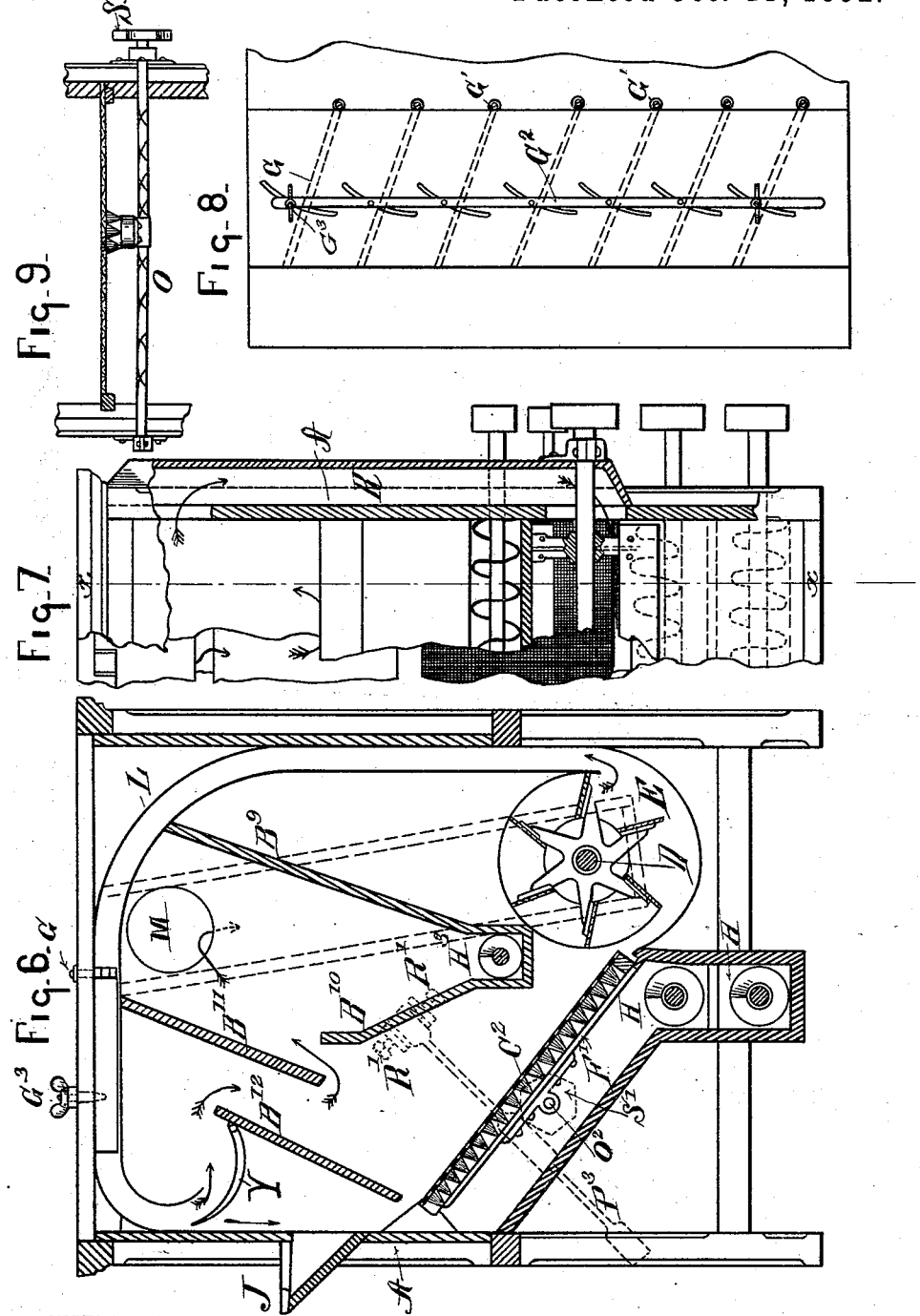
WITNESSES
F. Clough
Dell J. Browne
INVENTOR
Noah W. Holt
by Parker & Burton
Attorneys.

(No Model.) 5 Sheets—Sheet 5.

N. W. HOLT.
COMBINED SCALPER, PURIFIER, AND GRADER.

No. 484,202. Patented Oct. 11, 1892.

WITNESSES
D. W. Bradford
F. Clough

INVENTOR
Noah W. Holt
by Parker & Burton
Attorneys.

UNITED STATES PATENT OFFICE.

NOAH W. HOLT, OF MANCHESTER, MICHIGAN.

COMBINED SCALPER, PURIFIER, AND GRADER.

SPECIFICATION forming part of Letters Patent No. 484,202, dated October 11, 1892.

Application filed December 23, 1891. Serial No. 415,947. (No model.)

*To all whom it may concern:*

Be it known that I, NOAH W. HOLT, a citizen of the United States, residing at Manchester, county of Washtenaw, State of Michigan, have invented a certain new and useful Improvement in a Combined Scalper, Purifier, and Grader; and I declare the following to be a full, clear, and exact description of the invention, such as will enable others skilled in the art to which it pertains to make and use the same, reference being had to the accompanying drawings, which form a part of this specification.

My invention relates to that class of combined scalpers, graders, and purifiers employing a closed air-circulating current in combination with a bolting-surface and used in the manufacture of flour, which will be first described, and then particularly pointed out in the claims.

In the drawings are represented various forms in which the invention may be embodied, all of which involve the same general features and principles.

Figure 2:
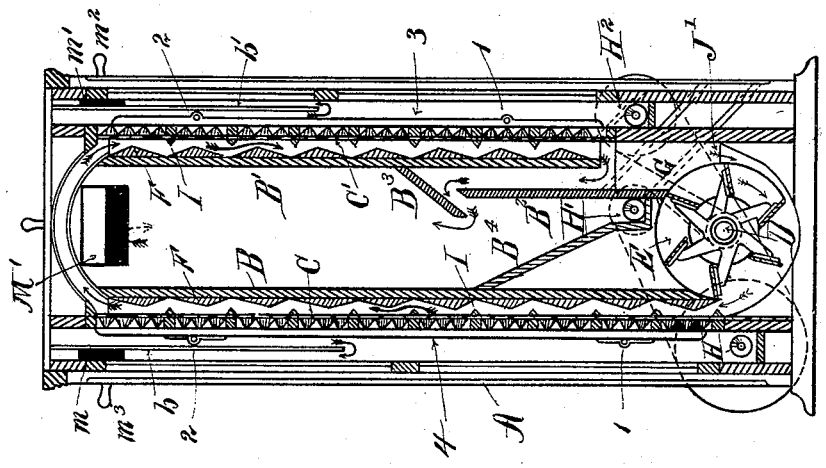
Figure 3:
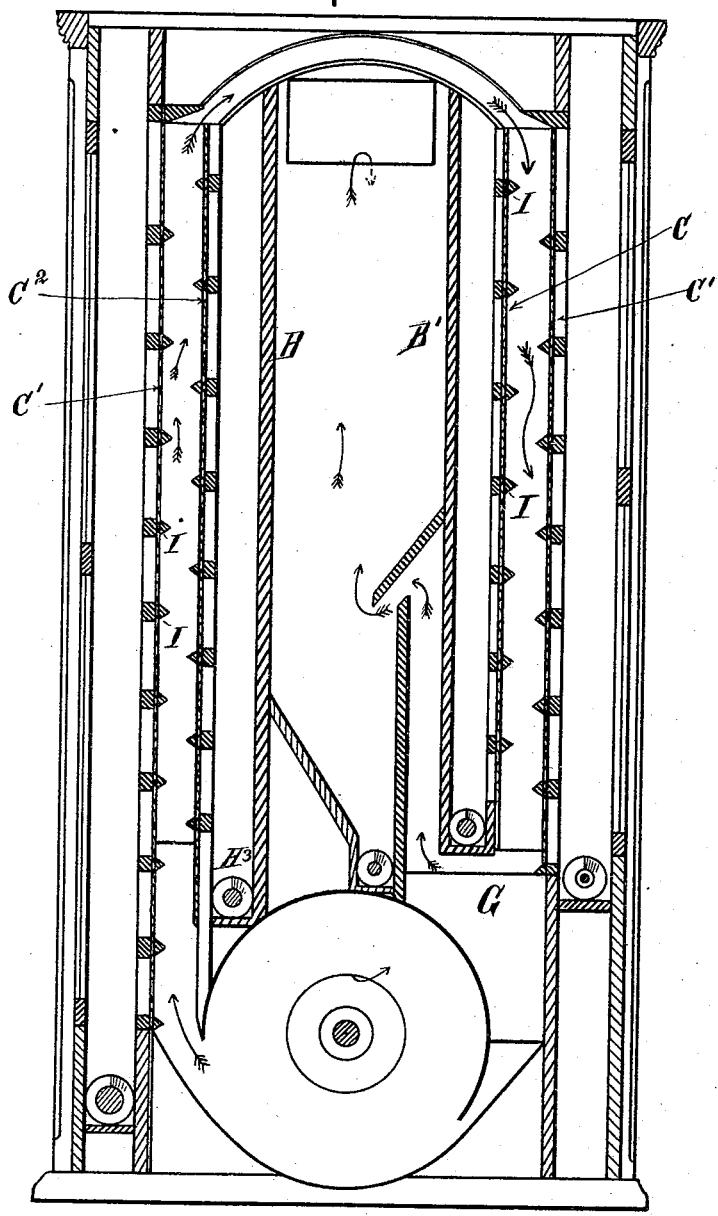
Figure 11:
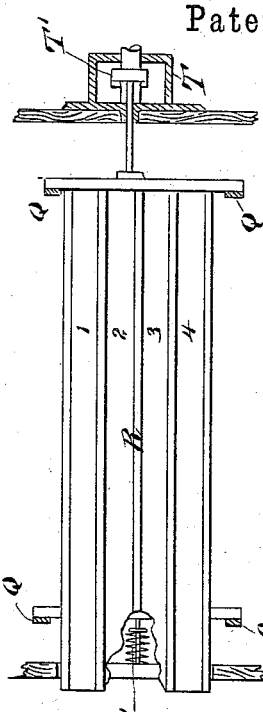
Figure 10:
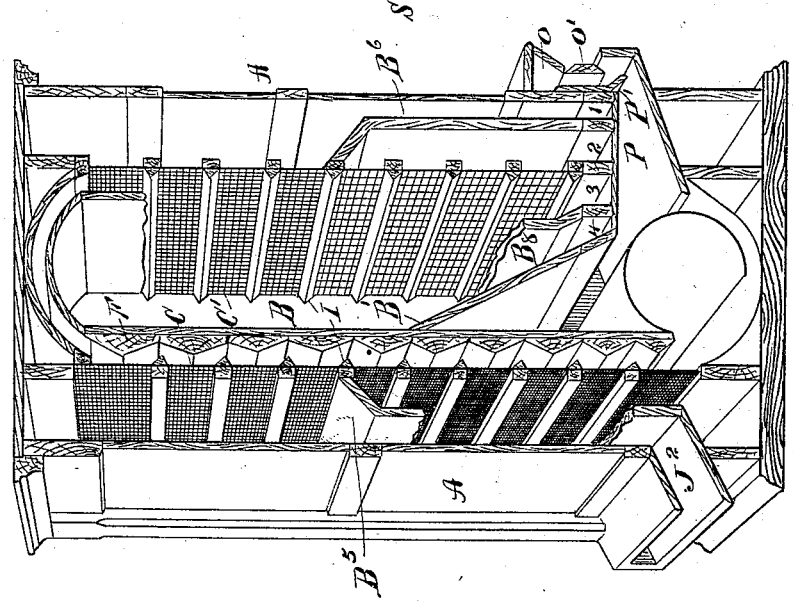

Figure 1 represents a side elevation of one form of improved machine with certain portions broken away to show the details of the interior arrangement and construction. Fig. 2 is a vertical cross-section of the same through lines $x$ $x$, showing details of construction and mode of operation thereof. Fig. 3 shows a vertical cross-section of another form of machine constructed upon the same principles. Fig. 4 illustrates a side elevation of another form, while Fig. 5 is a vertical cross-section of the same on line $x$ $x$, showing details in construction and illustrating its operation. Figs. 6 and 7 illustrate another modification which may be employed, Fig. 6 being a cross-section on line $x$ $x$ of Fig. 7. Fig. 8 illustrates the method of adjusting the deflecting-boards. Fig. 9 illustrates the screw-shaft and the cleaning-brushes used. Fig. 10 is a perspective view of the interior of the machine illustrated by Figs. 6 and 7, the fan and inner wall on the right-hand side being omitted to show the screens of varying mesh relative to the fan, the interior wall being also broken away for the same purpose. Fig. 11 is a plan view of the shaking-conveyers illustrated in Fig. 4 in section.

In the drawings, A represents the casing and frame of the machine. This in Fig. 1 is broken away close to the top.

B represents the interior casing, upon which are arranged longitudinal riffle-boards F F, with preferably a triangular section, as shown in Fig. 2.

C C' represent the bolting-surface, which forms a partition between the outer and inner casings A B upon either side of the machine, as shown in Fig. 2. This bolting-surface is divided vertically in the machine shown in Figs. 1 and 2 into cloth sections of different degrees of fineness, as shown in Fig. 1, the sections of the same degree being placed on opposite sides, the finest being nearest the front end of the machine, the next finest adjacent to the finest, but divided from it by a transverse partition L, extending between partition B B' and the bolting-surface C C', the coarsest being at the tail end of the machine and divided from the next finer by a partition L of like character. By this mode of construction the space between the partitions B B' and bolting-surfaces C C' is divided vertically into sections by the transverse partitions L L, thus forming, practically, wind-trunks open at the bottom and top for circulation of the inclosed air, as hereinafter described.

D represents a fan inclosed in fan-case E, as shown in Fig. 2. The fan and fan-case extend longitudinally through the lower portions of the machine, the extremities being shown at D D in Fig. 1. This fan is driven by any convenient manner from a countershaft or other convenient machinery.

J is a spout at the head of the machine and into which the material to be bolted or scalped is fed. This material goes directly into the fan-case at the head of the machine, as shown in Fig. 2 at J'.

The partition B' does not form a junction with the fan-case, but leaves a longitudinal opening above such case between the inclosed space or wind-trunk made by partition B' and the bolting-surface and another partition B², extending upward from the fan-case a short distance, there being angularly attached to the partition B' a covering-board B³, which acts as a deflector to the rising current, as hereinafter described. Below the lower end of the partition B' there are arranged and extending from the partition carrying the bolting-surface C' to the short partition B³ and the fan-case E a series of deflecting-boards G G, placed angularly, as shown in Fig. 1.

The wind-trunks upon opposite sides of the machine are connected at the top of the case by curved partitions, forming a semicircular or curvilinear passage from side to side, as shown in Fig. 2.

At either end of the machine are wind-trunks M, leading into the eyes of the fan at either end and connecting with the interior space inclosed by partitions B B' through the passages M' at the upper portion of the machine, one of which is shown in Fig. 2. Arranged upon the bolting-surfaces are longitudinal projecting baffle-strips I I I, which correspond in their arrangement with the depressions created by the arrangement of the riffle-boards F F. The arrangement and combination of the riffle-boards and baffle-strips and intervening bolting-surfaces is such as to produce vertical irregular chambers, as shown in section in Fig. 2. The deflecting-boards F F are preferably constructed and arranged so that the side presented to the current of air circulating as hereinafter described and in the direction of the arrows has a greater angularity to the partitions B B', as shown by the sectional Fig. 2, while the baffle-strips I I have their projecting portions preferably triangular, as shown in the drawings. As already stated, the partition B' only extends a portion of the way, but not entirely down to the fan-case. In the interior of the chamber thus formed by the partitions B B' and somewhat below the center of the partition B is angularly attached and projecting downwardly a partition B⁴. This partition as it approaches the partition B² is preferably changed in its direction, and a rectangular trough is thus formed by it and partition B² by closing in the two by a horizontal bottom. In this trough is placed one of the conveyers H', the pulley of which is dotted in on Fig. 1. A spout leading from the rear end of this conveyer-trough extends downwardly, as shown by dotted lines in Fig. 2, the opening of which is shown in Fig. 1 at N. In the bottom of the wind-trunks or chambers formed between the outer partition and the bolting-cloths are also placed conveyers, as shown in sectional Fig. 2 at H and H², the pulleys for driving which are shown in Fig. 1. A suitable outlet is provided for the trough-containing conveyer H', Fig. 2, either separately or in conjunction with the outlet to the conveyer H², which may by a suitable trough (not shown) connect the outlets of the two at the tail of the machine.

For the purpose of withdrawing from the bolted material any small particles of bran or other light substance I provide short partitions or curtains b b', interposed between the casing A A and the bolting-surfaces C C' and depending from the top of the machine, as shown in Fig. 2, thus forming recesses by curtaining off the upper portion of the chamber upon either side. At the top of these recesses I construct valve-openings at either end of the machine, as shown by m and m', leading from the upper ends of these recesses into the wind-trunks at either end of the machine. These valves are controlled by shutters, the handles of which are shown as m² m³ in Fig. 2. By means of these shutters the openings can be adjusted to any required size at the will of the operator. A shutter or valve can also be interposed in the openings M' from the interior chamber into the wind-trunks. By the proper adjustment of these valves or shutters covering the openings M', m, and m' the air-currents can be so adjusted that there can be a slight draft of air drawn from the recesses behind the curtains b and b', which will take out all the light material from the flour or bolted material which may pass through the bolting-surface. If found necessary to clean the bolting-cloths, traveling brushes may be used, as shown in Figs. 2 and 5, and marked 3 and 4. These brushes are conveniently made to travel from side to side and brush the bolting-surface by means of double reversible screws 1 1 2 2, as shown in Figs. 1, 2, and 5. I do not, however, regard the brushes as essential to the operation of my invention, as they are a common and well-known mode of cleaning bolting-surfaces.

In Fig. 1 a spout is shown at N' through which the products from the bolting-surfaces are discharged. These may be arranged in any convenient manner which would suggest itself to any one skilled in the art. The manner of belting is shown in Fig. 2 by dotted lines, except that the fan-case pulley may be driven from any convenient counter-shaft. (Not shown.)

It is obvious that many changes in detail can be made without departing from the principle of construction or the mode of operation of the invention described. Among such I have shown another form, (illustrated in Figs. 4, 5, and 10,) and also a general modification applicable to both forms, (shown in Figs. 1 and 2 and in Figs. 4, 5, and 10,) which modification is illustrated in Fig. 3. In Fig. 4 the outer casing is broken away and interior portions illustrated upon the line x x in Fig. 5. The lower portion is also broken away to show the interior arrangement of the shaking-conveyer and feed device. Fig. 5 is a vertical cross-section of Fig. 4 upon the line x x. In this modification A A represents the casing of the machine, constructed and paneled in the usual or in any convenient manner. B B' are interior partitions forming an interior air-chamber, substantially as in the machine described and illustrated in Fig. 2. It also has within the same the short partition B³, the deflecting angular partition B⁶, and the angular partition B⁷. It also contains the bolting-surfaces C C', in which, however, the bolting-cloths are arranged differently from the machine shown in Figs. 1 and 2, as more fully hereinafter described. It contains a fan D and fan-case E in the same relation to the interior of the machine shown and described in Figs. 1 and 2. It has the same arrangement of deflecting-boards and baffle-strips that are found in the machine described in Figs. 1 and 2, whereby the material is delivered successively against the bolting-surfaces upon either side of the machine, as in the other form. Instead, however, of the bolting-surface being divided perpendicularly into sections of different grades of fineness and having these sections separated from each other by the transverse partitions L L, forming wind-trunks open at bottom and top, as described in Figs. 1 and 2, and also having therein the deflecting-boards G G, the bolting-surface is divided horizontally into sections of different degrees of fineness, the finest $w$ being arranged next to the fan and receiving the material first coming therefrom, the next finer $x$ being arranged immediately above the finest, the two sections forming the bolting-surface for that side of the device, the next coarser $y$ being arranged upon the opposite side at the top of the machine, and the coarsest $z$ at the bottom, as shown more particularly in Fig. 10. Thus I have described four sections of different degrees of fineness arranged in the way specified, Fig. 4 showing the coarsest $z$ at the bottom and the next $y$ above, but not showing the finer sections, which are upon the opposite side of the machine. Each of these sections is divided by a horizontal partition from the adjacent section. This partition extends outwardly and downwardly into the space behind the bolting-cloth, and then downwardly, forming a perpendicular partition, or nearly so, as illustrated by $B^5$ and $B^6$ in Fig. 5, the surface of the same being shown as $B^6$ in Fig. 4 upon one portion of the figure, a portion being broken away to show the coarser section of bolting-cloth behind the partition. By this form of construction the bolting-surfaces are so separated from each other that the material passing through each will not be commingled with that passing through any other section.

It will be observed that the space between the bolting-cloth and partition $B^5$ opens into the conveyer H at the bottom of the machine upon that side, whereby the products are conveyed to the end and delivered out of the machine. The space between partition $B^5$ and the casing A conveys the material from the next coarser section of bolting-cloth and delivers it to the spout $J^2$. Upon the opposite side of the machine (shown in Fig. 5) the material through the next-coarser section of the bolting-cloth is delivered between the partition $B^6$ and the casing A into the compartment numbered 1 of the shaking-conveyer, while the material derived from the coarsest section of bolting-cloth, between the bolting-cloth and the partition $B^6$, is to be delivered into section numbered 2 of the same conveyer, and by these two sections delivered at the tail of the machine, as hereinafter stated. If desired, there may be placed, as shown in the drawings in Fig. 5, traveling brushes working upon reverse screws in the same manner as is shown in Figs. 7 and 8 and corresponding to each section. As shown in the drawings, there are four of these brushes and four screws W W' $W^2$ $W^3$. In Fig. 4 the shafts are shown as journaled in the frame of the machine and carry pulleys $W^4$ and $W^5$, by which they may be driven, and by means of the reverse screw connected upon the shafts the brushes are compelled to reciprocate from end to end of the respective sections of bolting-cloth to which they are applied.

The machine illustrated by Figs. 4, 5, and 10 has arranged thereon a feeding trough or spout O, arranged longitudinally along the side of the machine, as shown in Fig. 4. The bottom of this trough O is separated from the machine and is attached to a shaker-frame P and has thereon a valve O', by which the discharge-opening is regulated. This shaker-frame extends longitudinally from end to end of the interior portion of the machine, as shown in Fig. 4, and is suspended at either end by spring-hangers Q Q. In depth it extends nearly to the center of the machine, as shown in Fig. 5 and a plan of the same in Fig. 12, and is longitudinally divided interiorly into four troughs 1 2 3 4 by longitudinal partitions. The first of these troughs corresponds with the inclosed air-space between the casing A and the partition $B^6$, the second with the space between the bolting-cloth C' and the partition $B^6$. The third division is at the bottom of the air-space between the cloth C' and partitions $B^8$. The fourth receives the dust from the dust-chamber between the partitions $B^7$ and $B^8$, all as illustrated in Fig. 5. The bottoms of these three several divisions are not arranged horizontally; but the front end is raised above the rear end at an angle sufficient to secure the travel of the material thus falling in said troughs toward the rear end, as shown by Fig. 4 at R. At the rear end they open into separate spouts, and thus the material taken from each separate division may be discharged from the machine in any convenient manner.

The shaker-frame P, carrying the several troughs 1 2 3 4 and also a distributing-board P', upon which the material is fed, as shown in Figs. 5 and 10, is compelled to vibrate longitudinally while the machine is in action by means of the following-described apparatus: Rigidly attached to the shaker-frame and at either end thereof are two pins S and S', which extend through the wind-trunks, one at the rear of the machine, to the casing A. The one at the front of the machine S extends through said casing and is free to move therein. By bracket-bearings T, attached to the casing A at the front of the machine, is a camshaft driven by a pulley, as shown in Fig. 4, and to which is attached a face-cam T'. Upon the pin S' is arranged a spiral spring impinging against a collar rigidly attached to said pin. The tendency of this spring is to force the shaker-frame toward the front of the machine, and consequently firmly press the pin S against the face of the cam T'. It is obvious that if rotation is given to the shaft carrying the cam T the pin S will be longitudinally forced inward by the cams against the spring upon the pin S', compelling thereby a corresponding movement of the shaker-frame. Upon passing the cam the spring at S' will instantly force the shaker-frame upward to an engagement with the cam T'. By this apparatus an efficient longitudinal vibration is given to the entire shaker-frame carrying the troughs and the deflecting feeding-board, as hereinbefore described, whereby the material lodging in the troughs 1 2 3 is conveyed to the spouts and to the outside of the machine, and whereby the material by means of the deflecting feeding-board P' is evenly distributed throughout the whole width of the machine, and then slides over a deflecting-board attached to the under side of the shaker-frame P, leading thereby into the opening into the fan-case, as illustrated in Fig. 5.

Fig. 3 is more particularly a modification of features shown in Figs. 1 and 2, but applicable to the machine shown in Figs. 4 and 5, containing a fan-case and fan, the end wind-trunks, and one more conveyer $H^3$. It is obvious from an examination of the drawings that the general construction is the same with this exception, the deflecting-boards F F are dispensed with upon either side of the machine. In their places are erected two additional bolting-surfaces $C'$ $C^2$, which bolting-surfaces are divided into cloths of different degrees of fineness corresponding to those of C C', as shown in Figs. 1 and 2, and also have thereon the bevel-strips I I, arranged alternately with those of the bolting-surface C. The partitions B B' are constructed at a short distance interiorly from the interior bolting-surfaces $C'$ $C^2$, so as to form additional chambers for the reception of the bolted material behind those bolting-surfaces. At the bottom of each chamber for the reception of bolted material and also of the interior chamber are arranged suitable conveyers, substantially as hereinbefore described. The chambers between the two bolting-surfaces C C' and $C'$ $C^2$ are divided perpendicularly by transverse partitions L L, as shown in Fig. 1, being modified simply to conform to the two bolting-surfaces instead of to the construction shown in Fig. 1. These are open at top and bottom, as hereinbefore described, and form wind-trunks corresponding to the different sections of the bolting-cloths of different degrees of fineness. At the bottom of the shorter chambers are arranged the deflecting-boards G G, substantially as shown in Fig. 1 and performing the same offices.

It is obvious that in order to secure the separations of different grades in the machine shown in Figs. 1 and 2, cut-off boards may be interposed in the bottoms of the troughs of the conveyer at a point corresponding with the tail end of each section of bolting-cloth, and from such point an outlet to the outside of the machine may be created in each case, whereby the separations from each division would thus be conveyed separately and delivered to any convenient receptacle, as desired. This is not shown in the drawing as it is a common and familiar method of separating deposits in different portions of a conveyer from each other and delivering them, and is familiar to all mill-men, and is not a portion of my invention, and therefore needs no extended description or illustration.

Figs. 6, 7, 8, 9, and 11 illustrate another modification of my improved scalper and grader, Fig. 6 being a vertical longitudinal section on line $xx$ of Fig. 7, which is an irregular vertical section of one end, showing the relative position of the interior portions, Fig. 8 showing the arrangement and mode of controlling the deflecting-boards and Fig. 9 showing the manner of manipulating a traveling brush underneath the grader, Fig. 11 being a plan view of the grader with the brush omitted. In this form of construction A A represent the casing. $B^9$, $B^{10}$, $B^{11}$, and $B^{12}$ represent interior partitions. $C^2$ represents the grader bolting-sieve. D represents the fan. E represents the fan-case. J represents the spout into which the material is fed. K represents the wind-trunk, leading from the interior of the machine to the eye of the fan-case. H H H are conveyers. M is the opening of the wind-trunk, from the interior of the machine. L represents a curved partition. F' is a brush for the purpose of cleaning the meshes of the grader and is moved alternately from side to side by the double screw O', which is driven by a pulley, as shown in Fig. 9. This shaker-frame is attached to a spring-bar $P^3$, the lower end of which is rigidly fastened to the frame of the machine, and the upper end adjustably attached to the casing by means of set-screws R' R', whereby the position of the shaker-frame upon its bearings or ways can be longitudinally adjusted, and by means of which, also, the tension of the springs of the bar can be adjusted with reference to the cam S', which is rigidly attached to the shaft O and turns with it. The rapid rotation of the shaft O thus rotates the cam, which by its polygonal sides creates a rapid movement in the frame in consequence of its being attached to the enlargement of the spring-bar $P^3$, the spring of the bar returning it upon every thrust of the cam. The rotation of said shaft also compels the traveling brush to travel from side to side underneath the grader frame and sieve in a similar manner to the brushes already described and for which I do not claim anything novel.

Fig. 8 shows in detail the manner of manipulating and controlling the angularity of the deflecting-boards G G. (Shown in Fig. 6.) These deflecting-boards are pivoted at one end, as shown at G', and thus they are enabled to swing at the will of the operator. They are controlled simultaneously in the swinging movement by means of the bar $G^2$, which is attached by proper pivots to each deflecting-board. These pivots pass through curvilinear slots in the casing, so that the movement of the bar will simultaneously move each deflecting-board to the same extent and permit the operator to adjust them at any desired angle within the limits of the construction. A jam-nut $G^3$ is provided whereby the bar can be set at any desired position and held rigidly until it is desired to make any required change.

Having thus described my improved machine in its various forms, the operations of the same are as follows:

In the machine illustrated by Figs. 1 and 2 the material is fed into the spout J and passes thence into the fan-case through a narrow inlet, as shown in Fig. 2 by the arrow. In the fan-case it is driven forward by the action of the fan and by the air-current created thereby into the wind-trunk upon the opposite side of the machine, where it meets the finest division of bolting-surface, following the directions of the arrows, the operations of the machines in Figs. 2 and 5 in that respect being identical. The ascending current of air carries the material through the serpentine air-space between the deflecting-boards F F, the bolting-surfaces, and past the baffle-strips I I. It is obvious upon inspection that as the current of air laden with the material fed into the machine is thus carried upward in this space it will be driven against the bolting-surfaces, being driven against the separate divisions of such bolting-surfaces by the angularity of the deflecting-strips F F, and that the office of such deflecting-strips and of the baffle-strips I I is to compel a continuous deflection of air against the bolting-surfaces in the manner described. By this means the finer material is driven through the bolting-surface and the coarser material is retained and carried upward until it is carried over the curvilinear passage at the top of the machine and down through the other side by a similar arrangement of deflecting-boards and baffle-strips, combined with the bolting-surface until it reaches the open space at the bottom of the partition B'. At this point, in the machine illustrated by Figs. 1 and 2, it is deflected toward the rear of the machine by the deflecting-boards G G, where it passes through the opening underneath said boards and rises, due to the continuity of the air-current, in a position farther removed from the head of the machine until it makes another circuit through the air-passage created by the deflecting-strips and bolting-surface, when it is again deflected farther toward the rear of the machine, until it has finally reached the end. A certain portion, however, of the air is drawn up between the partitions B' and $B^2$, deflected by the deflecting-partitions $B^3$, and thereby checked. This permits material or dust to fall at that point, and as the air passes the deflecting-partition $B^3$ into an enlargement of the chamber above it it is further checked in its motion by its expansion, thus permitting such dust as it may still contain to fall to the bottom of that chamber, where the conveyer H' withdraws it from the machine. The air, still rising, passes through the opening M', down through the wind-trunks M M, to the eye of the fan, as illustrated by Fig. 1, where the circulation is again resumed, and by the movement of the fan rendered continuous. It will be perceived that the course of the circulation of the air is in a spiral form from the front to the rear of the machine and that such spiral current is produced by the deflecting-boards G G. The bolted material that is thus driven through the bolting-surfaces is collected by the conveyers H $H^2$ and conveyed from the machine thereby. Some important effects result from this arrangement. The compelling of the air-currents to strike the bolting-surfaces angularly results in keeping the bolting-cloths clean and free from clogging without any additional appliances, as is common in most bolting-surfaces for that purpose. It also effects a very clean and complete separation of the material, which has not hitherto been secured in any construction known.

The operation of the machine illustrated in Figs. 4 and 10 is quite similar to the one illustrated in Figs. 1 and 2 in the method of bolting, the construction of the machine compelling the air ladened with the material to be bolted to impinge against the bolting-surfaces in the circulation in exactly the same manner as in the machine illustrated by Figs. 1 and 2. As, however, there are no perpendicular partitions conforming to the various grades of bolting-cloth and no deflecting-boards like those shown at G G in Fig. 1, and as the bolting-surfaces are graded horizontally, as hereinbefore described, the bolted material passes but once around the machine or makes but one revolution before being drawn off through the openings M', and from thence back into the eye of the fan, it being found that with some grades of material this arrangement is simpler and the operation requires less power than in the motion described in Figs. 1 and 2. It is evident that the material bolted through the finest section of cloth would descend into the trough occupied by the conveyer H and be drawn by it out of the machine, while that passing through the next-finest grade, immediately above, would be drawn off through the spout $J^2$, while the material passing over to the opposite side of the machine and striking the bolting-surface having a still-coarser mesh would be bolted and the resultant material pass into the first compartment of the shaking-conveyer, while the coarsest, passing through the bottom and the coarser sections, would be conveyed away by the second compartment of the shaking-conveyer. The remaining material not bolted would be divided, depending upon its specific gravity, a portion of it dropping into the third compartment of the shaking-conveyer and being conveyed thereby out of the machine. The dust and light material that would pass into the enlarged air-chamber between the inner partitions would be caused to settle thereby, and would be conveyed out of the machine by means of the fourth compartment of the shaking-conveyer.

The mode of operation of the machine illustrated by Fig. 3 is almost identical with that illustrated in Figs. 1 and 2, the difference being in the operation of the two bolting-surfaces placed adjacent to each other instead of the one bolting-surface, as in the first-described machine. By this means the deflecting-strips are dispensed with and the space is made to do duty as a bolting-surface instead. It is evident that the adjacent faces of bolting-surface would bolt material so that the bolted material passing through either side into the conveyers, which are adjacent to each other, would be practically the same, and in the spouting outside of the machine would be ultimately run into the same receptacle.

The mode of operation of the device shown in Figs. 6, 7, 8, and 9 is as follows: The material to be graded is fed into the spout J and immediately passes down upon the grader $C^2$ in an even sheet over its entire surface, the fan-case and conveyer-shafts and the knocker-shaft O all being set in motion by suitable belting at the same time. The bolted material passing through the grader falls into the space below and is directed into the conveyer-spouts and delivered by the conveyers into any suitable outside receptacle and is controlled by the cut-off slides, as hereinbefore indicated. The motion of the fan produces an internal current of air in the directions indicated by the arrows. The air coming in from the wind-trunks into the eye of the fan (shown in Fig. 7) is forced out at the periphery into the narrow passage-way formed by the partitions L, carrying with it the material which passes over the grader and is delivered into the fan-case, as shown in Fig. 6, the deflecting-boards G G shifting the currents continually from the front to the tail of the machine, so that spiral current is established. The valve Y divides the current on its outlet from the curvilinear passage, so that the heavier material carried over drops down in the opening between the valve and the casing, as shown by the arrow, and is again brought upon the shaker with the stream of entering material. It is obvious that the heavier portion would take the outside of the circuit, and hence be brought outside the valve Y, just described. The lighter portion is carried inside of the valve and diverted into the chambers formed by the partitions $B^{11}$ $B^{12}$, where the air-current, suddenly enlarging, it gradually settles, the heavier portion descending to the grader, while the lighter is drawn up in the direction of the arrow through the opening between the partitions $B^{10}$ and $B^{11}$ into a second chamber, where the air-current enlarges again and is checked in motion, and the residue or dust thus settles and is taken out by the conveyer $H^3$. The purified air passes through the opening M into the wind-trunk M', and from thence into the eye of the fan, where it commences again the circuit that has already been described. The upper passages from one side to the other of the spaces in which the material is bolted I preferably make curvilinear, in order to prevent the settling of any dust upon flat or angular portions of such passages if otherwise made. The passage, also, ought not to be too large, and is made, preferably, of not a greater capacity than the wind-trunks in which the bolting is performed, the object being at this point to create a comparatively-rapid circulation of the air, so as to carry over all material which might reach and enter the passage without permitting it to be deposited therein.

By the employment of this means of bolting I secure great advantages, as I dispense entirely with the handling of the stock by machinery other than that employed to set the current in motion, and consequently save what may be termed the "wear" of the stock due to its handling by machinery, as it is well known that the more the stock is handled, especially by machinery, the more it deteriorates in quality as well as in the quantity of the desirable results. The wear of machinery breaks up the particles of bran so that they become fine enough to pass through the finest bolting-surfaces, and the consequence is that where machinery is used to handle stock the resultant flour is liable to be specky and otherwise impaired in quality.

It is obvious that the principle and combination employed in my machine may be varied into numerous forms without departing from either the principle, the combination, or the mode of operation, and I do not desire to limit myself to the forms shown and described in the drawings. For instance, instead of employing the riffle-boards and baffle-strips in connection with the wind-trunks having the bolting-cloths, the wind-trunks may be constructed by arranging the bolting-surface in an irregular manner corresponding with the baffle-strips and riffle-boards, thus taking the places of such strips and boards, so that the air-currents would be deflected from side to side from the annular bolting-surfaces, and thus the air-currents would accomplish the bolting in the same manner that they do in the construction shown—that is, by impinging at an angle against the bolting-cloths, whereby the material adapted to pass the meshes will be driven through and separated from the coarser material. I do not therefore desire to limit myself to the specific means shown, whereby the same principle may be employed.

What I therefore desire to claim is—

1. In a separating-machine, the combination of a fan and fan-case, feed mechanism feeding the material to be separated directly into the fan-case, wind-trunks communicating with the fan-case the walls of which are formed wholly or partially of bolting material, a settling-chamber communicating with said wind-trunks, and a return-flue for the purified air, leading to the eye of the fan, substantially as described.

2. The combination of a fan and fan-case, wind-trunks communicating with the fan-case the walls of which are formed wholly or partially with bolting material, each separate wind-trunk having the bolting material of its walls of a different degree of fineness from that of the adjacent wind-trunks, and means whereby the air-currents are compelled to traverse the wind-trunk containing the finest material successively to that of the coarsest bolting material, substantially as described.

3. The combination of a fan and fan-case, feed mechanism adapted to feed directly into the fan-case, perpendicular wind-trunks communicating with said fan-case and adapted to receive the material therefrom, the walls of which are composed wholly or partially of bolting material, a dust-collecting chamber, and return-passages to the eye of the fan, substantially as described.

4. The combination of a case containing feed and discharge openings, a fan and fan-case, wind-trunks the sides of which are constructed wholly or partially of bolting-surfaces the meshes of which open into dead-air-receiving chambers, a dust-collecting chamber into which said wind-trunks open, and a return-flue leading to the eye of the fan, substantially as described.

5. The combination of a fan, fan-case, wind-trunks communicating with said fan-case the walls of which are wholly or partially constructed of bolting-cloth, and a dust-collector located in the return-flue between said wind-trunks and the eye of the fan, substantially as described.

6. In a separating-machine, the combination of a fan, fan-case, wind-trunks the surfaces of which are composed wholly or partially of bolting-surfaces, and a return-passage for the air from the outlet of said wind-trunks to the eye of the fan, all so arranged that the material to be graded is compelled to pass in a direction substantially parallel to the face of the bolting-surfaces by means of air-currents, substantially as described, and a dust-collecting chamber communicating with said wind-trunks, into which the residue from the wind-trunks is conveyed, and a passage therefrom to the eye of the fan, substantially as described.

7. In a separating-machine, a substantially-air-tight casing containing feed and discharge openings, wind-trunks located therein the walls of which are wholly or partially formed of bolting-surfaces of different degrees of fineness, means for compelling the passage of a current of air carrying the material to be separated through said wind-trunks in a general direction substantially parallel to said bolting-surfaces, and means whereby the material to be separated is caused to impinge against said bolting-surfaces, whereby the material is separated into grades of different degrees of fineness, substantially as described.

8. In a separating-machine, the combination of a rotary fan, a fan-case, feed mechanism feeding directly into the fan-case, wind-trunks the walls of which are composed wholly or partially of bolting-surfaces, a dust-collecting chamber, and wind-trunks leading therefrom to the eyes of the fan, substantially as described.

9. In a separating-machine, the combination of a rotary fan, a fan-case, wind-trunks the walls of which are composed wholly or partially of bolting-surfaces, a dust-collecting chamber, and wind-trunks leading therefrom to the eyes of the fan, substantially as described.

10. The combination of a fan, a fan-case, wind-trunks adapted to receive the material to be bolted, purified, scalped, or graded, the walls of which are wholly or partially constructed of bolting-cloth, riffle-boards, and baffle-strips arranged to deflect the currents of air carrying the material against the bolting-surfaces, substantially as described.

11. The combination of a closed case having an inlet-opening for the material to be operated upon and exit-openings discharging the various grades therefrom, a fan-case inclosed in said case, a fan inclosed in the fan-case, wind-trunks through which the material to be operated upon is driven by the air-blast from the fan, a bolting-surface forming a portion of the walls of said wind-trunks, devices for deflecting the currents carrying the material against the bolting-surfaces, and a dust-collecting chamber and wind-trunks leading therefrom into the eye of the fan, substantially as described.

12. The combination of a closed case having an inlet-opening for the material to be operated upon and exit-openings discharging the various grades therefrom, a fan-case inclosed in said case, a fan inclosed in the fan-case, wind-trunks through which the material to be operated upon is driven by the air-blast from the fan, bolting-surfaces of different degrees of fineness forming the walls of said wind-trunks, devices for deflecting the currents carrying the material against the bolting-surfaces, deflecting-boards for shifting the current from one wind-trunk to the other and compelling the air-current to traverse the machine in a cycloid manner, a settling-chamber, and wind-trunks leading from said settling-chamber to the eye of the fan, substantially as described, and for the purposes set forth.

13. The combination of a case having an inlet and one or more outlet openings for the material operated upon, a fan-case therein, a fan in said fan-case, a grading-sieve or bolter adapted to deliver the tailings therefrom into the fan-case, a passage leading from said fan-case into dust-collecting and settling chambers, deflecting-boards placed in said passage to shift the circulating current from the head to the tail of the machine, and a wind-trunk leading from the dust-settling chambers to the eye of the fan, substantially as described.

14. The combination of a case having inlet and one or more outlet openings for the material to be operated upon, a fan-case therein, a fan in said fan-case, a grading-sieve or bolter adapted to deliver the tailings therefrom into the fan-case, a passage leading from said fan-case into dust collecting and settling chambers, and a wind-trunk leading from the dust-settling chambers to the eye of the fan, substantially as described.

15. The combination of a case having inlet and one or more outlet openings for the material operated upon, a fan-case therein, a fan in said fan-case, a grading-sieve or bolter adapted to deliver the tailings therefrom into the fan-case, the passage leading from said fan-case into dust collecting and settling chambers, and a partition and adjustable valve whereby the heavier dust is separated out and returned to the grading-sieve, substantially as shown and described.

16. In a separating-machine in which the air-currents are returned by suitable wind-trunks to the eye of the fan, the combination of partitions forming passage-ways therein the walls of which are formed wholly or partially of bolting-cloths, each passage-way having its cloth of a different degree of fineness from the others, the finest being at the head of the machine and the coarsest at the tail, and deflecting-boards G G, whereby the circulating current carrying the material is shifted from the head to the tail of the machine, substantially as set forth.

17. In a combined scalper, purifier, and grader in which the air-currents are returned by suitable wind-trunks to the eye of the fan the walls of which are constructed of bolting-cloth of different degrees of fineness, the combination, with a passage-way therein, of adjustable deflecting-boards G G, whereby the circulating current carrying the material is shifted from the head to the tail of the machine, substantially as described.

18. The combination of vertical bolting-surfaces forming either wholly or partially the sides of wind-trunks through which the material is carried by air-currents with cloth-cleaning devices, substantially as described.

19. In a separating-machine, the combination of a substantially-air-tight case having inlet and outlet openings for the passage of the material to be operated upon, in combination with perpendicular wind-trunks the sides of which are formed wholly or partially of bolting-cloths, a fan, a fan-case so arranged that the air-currents operate perpendicularly over the bolting-cloths of said wind-trunks, and conveyers conveying the separated material out of said case, substantially as described.

20. In a separating-machine, the combination of a substantially-air-tight case having inlet and outlet openings, a fan and fan-case situated therein, substantially-vertical wind-trunks the sides of which are wholly or partially composed of bolting-cloths, and a curvilinear passage connecting the upper portions of such opposite wind-trunks, whereby the material is prevented from settling in said passage-ways, substantially as described.

21. In a combined separating-machine and dust-collector consisting of a substantially-air-tight case containing a fan-case, a fan, and substantially-vertical wind-trunks the sides of which are composed wholly or partially of bolting-cloth, a settling-chamber connecting with the outlet end from said wind-trunks and receiving the dust and air-current therefrom, the combination and arrangement of wind-trunks extending from the eyes of the fan and connected by adjustable openings to the settling-chamber and also to the air-spaces forming the receptacles behind the bolting-surfaces, whereby the strength of the currents from these receptacles and from the wind-trunks can be reciprocally adjusted, substantially as described.

22. In a combined separating-machine and dust-collector consisting of a substantially-air-tight case containing a fan-case, a fan, and substantially-vertical wind-trunks the sides of which are composed wholly or partially of bolting-cloth, a settling-chamber connecting with the outlet end from said wind-trunks and receiving the dust and air-current therefrom, the combination and arrangement of wind-trunks extending from the eyes of the fan and connected by adjustable openings to the settling-chamber and also to the air-spaces forming the receptacles behind the bolting-surfaces, and short partitions within said air-spaces, whereby a current of air may be caused to rise through the lower portion of the falling bolted material, substantially as described, and for the purpose set forth.

23. A combined separating-machine and dust-collector consisting of the closed case having inlet and outlet openings for the material operated upon, a fan, a fan-case into which the material is fed and consisting of wind-trunks the sides of which are constructed wholly or partially of bolting-surfaces and connected with the outlet from said fan-case, whereby the material to be bolted is forced over the bolting-surfaces by air-currents, exterior substantially-dead-air chambers to receive the bolted material, an interior settling and dust-collecting chamber connected with the bolting wind-trunks, wind-trunks connecting said settling-chamber with the eyes of the fan, and suitable conveyers whereby the material thus bolted, graded, or separated is conveyed from the machine, substantially as described.

In testimony whereof I sign this specification in the presence of two witnesses.

NOAH W. HOLT.

Witnesses:
C. W. CASE,
J. F. NESTELL.